(12) United States Patent
Liu et al.

(10) Patent No.: US 6,717,805 B2
(45) Date of Patent: Apr. 6, 2004

(54) TRAY-TYPE CONNECTING MODULE FOR ELECTRONIC MEMORY CARDS

(75) Inventors: Wen-Tsung Liu, Hsin Tien (TW); Chih-Pin Yang, Hsin Tien (TW)

(73) Assignee: Carry Computer Eng. Co., Ltd., Taipei (TW)

( * ) Notice: Subject to any disclaimer, the term of this patent is extended or adjusted under 35 U.S.C. 154(b) by 19 days.

(21) Appl. No.: 10/241,580

(22) Filed: Sep. 12, 2002

(65) Prior Publication Data

US 2004/0032709 A1 Feb. 19, 2004

(30) Foreign Application Priority Data

Aug. 13, 2002 (TW) ........................... 91118218 A

(51) Int. Cl.⁷ .................. H01R 13/44; G06K 7/00
(52) U.S. Cl. .................. 361/684; 361/683; 361/737; 235/486; 439/137; 439/630
(58) Field of Search .................. 361/737, 741, 361/756, 753, 733, 750, 683–685; 235/441, 449, 487, 486, 483, 492; 439/137, 138, 677, 951, 157, 160, 155, 159, 153, 140, 737, 260, 261, 377, 136, 142, 545, 630, 904, 924, 928.1, 331, 946, 946.2, 634, 326; 174/35 R, 35 GC, 51; 365/51–52, 53

(56) References Cited

U.S. PATENT DOCUMENTS

| 5,315,478 A | * | 5/1994 | Cadwell et al. | 361/684 |
| 5,600,539 A | * | 2/1997 | Heys et al. | 361/684 |
| 5,905,253 A | * | 5/1999 | Ito et al. | 235/486 |
| 5,906,516 A | * | 5/1999 | Sato et al. | 439/630 |
| 5,980,294 A | * | 11/1999 | Kanda et al. | 439/326 |
| 6,002,605 A | * | 12/1999 | Iwasaki et al. | 365/51 |
| 6,075,706 A | * | 6/2000 | Learmonth et al. | 361/737 |
| 6,086,425 A | * | 7/2000 | Lescoat | 439/630 |
| 6,206,710 B1 | * | 3/2001 | Chen | 439/159 |
| 6,264,483 B1 | * | 7/2001 | Wilson | 439/137 |
| 6,641,441 B2 | * | 11/2003 | Liu | 439/630 |

FOREIGN PATENT DOCUMENTS

| JP | 410154210 A | * | 6/1998 | ........ G06K/17/00 |
| JP | 02002025694 A | * | 1/2002 | ........ H01R/13/629 |
| JP | 02002216082 A | * | 8/2002 | ........ G06K/17/00 |

* cited by examiner

Primary Examiner—Michael Datskovsky
(74) Attorney, Agent, or Firm—Bacon & Thomas, PLLC

(57) ABSTRACT

The tray-type connecting module for electronic memory cards of the present invention is comprised of a base placed on an electric circuit board and a tray openable and closable by sliding on the base for opening and closing. Wherein the bottom of the base is provided with a plurality of through holes in opposition to a plurality of connecting points on the electric circuit board. The bottom of the tray is provided in corresponding to the through holes with a plurality of pins; when the tray is moved to slide for opening in order to receive an electronic memory card, the pins contact with the input/output pins on the electronic memory card; and when the tray is moved to slide for closing, the pins of the tray are in alignment with the through holes, and are electrically connected with the connecting points on the electric circuit board via the through holes.

11 Claims, 7 Drawing Sheets

TRAY-TYPE CONNECTING MODULE FOR ELECTRONIC MEMORY CARDS

BACKGROUND OF THE INVENTION

1. Field of the Invention

The present invention is related to a tray-type connecting module for electronic memory cards, and especially to such a module connecting an electronic memory card at least from those cards such as a Compact Flash Card, a Smart Media card, a MultiMedia card, a Secure Digital card and a Memory Stick card with an electric circuit board to make two way data transmission for reading and writing between the electronic memory card and the circuit board.

2. Description of the Prior Art

A conventional connector for an electronic memory card 2 having a slot is provided on an electric circuit board provided in a housing 1 (as shown in FIG. 1); the slot of the housing 1 is for insertion and extraction of the electronic memory card 2. When the electronic memory card 2 is inserted into the slot of the housing 1, it can be electrically connected with the memory card connector in the housing 1, and can be electrically connected with the electric circuit board provided in the housing 1 through the memory card connector.

The electronic memory card 2 can be any of various specifications (at least includes one of Compact Flash Card, Smart Media cards, MultiMedia cards, Secure Digital cards and Memory Stick cards); it has on different positions thereof several input/output pins but with a common using mode, namely, in the course that the electronic memory card 2 is inserted into the slot of the housing 1, the input/output pins are frictionally contacting with a plurality of elastic pins in the memory card connector; when the electronic memory card 2 is inserted in position, they are tightly contacted with the elastic pins in the memory card connector.

In other words, during the course of insertion and extraction of the electronic memory card 2, the input/output pins are continuously rubbing on the elastic pins in the memory card connector, after a long period, the input/output pins of the electronic memory card 2 are subjected to damage by rubbing. And once the electronic memory card 2 is damaged, the entire electronic memory card 2 can not be used to thereby result loss of important data. Such a large defect gets more and more significant under gradually getting popularized of the electronic memory card 2. In view of this, the inventor of the present invention studied the connecting relationship between the electronic memory card and the memory card connector, and develops the tray-type connecting module for electronic memory cards of the present invention.

SUMMARY OF THE INVENTION

Particularly, the tray-type connecting module for electronic memory cards of the present invention is comprised of a base placed on an electric circuit board and a tray openable and closable by sliding on the base. Wherein the bottom of the base is provided with a plurality of through holes in opposition to a plurality of connecting points on the electric circuit board. The bottom of the tray is provided in corresponding to the through holes with a plurality of pins; when the tray is moved to slide for opening in order to receive an electronic memory card, the pins contact with the input/output pins on the electronic memory card; and when the tray is moved to slide for closing, the pins of the tray are in alignment with the through holes, and are electrically connected with the connecting points on the electric circuit board.

The main object of the present invention is: after the above stated electronic memory card is received in the tray, by sliding of the tray to its proper position, the pins of the tray are electrically connected with the connecting points on the electric circuit board via the through holes. Hence, during the course of placing the electronic memory card on the memory card connector, the input/output pins will not rub the pins of the memory card connector, damage by rubbing of the input/output pins can be avoided, and thereby life of use of the electronic memory card can be prolonged.

The secondary object of the present invention is: during the course of placing the electronic memory card on the memory card connector, the input/output pins will not be rubbed in sliding by the memory card connector, the orientation of placing of the electronic memory card is not limited. Electronic memory cards of different specifications can commonly use the receiving space in the memory card connector. Thereby, a memory card connector can receive any of multiple electronic memory cards with different specifications; this indirectly allows communication of the data among the multiple electronic memory cards with different specifications.

Another object of the present invention is: the tray is provided on the front edge thereof with a limiting member for automatically pressing and holding the electronic memory card in position when the electronic memory card is placed on the memory card connector. When the electronic memory card is to be taken out, the limiting member relieves the electronic memory card from its proper position for easy taking out, thereby an object of convenience for use can be achieved.

The present invention will be apparent in its detailed structure, application principles, functions as well as effects after reading the detailed description of the preferred example thereof in reference to the accompanying drawings.

DETAILED DESCRIPTION OF THE PREFERRED EMBODIMENT

Figure 1:
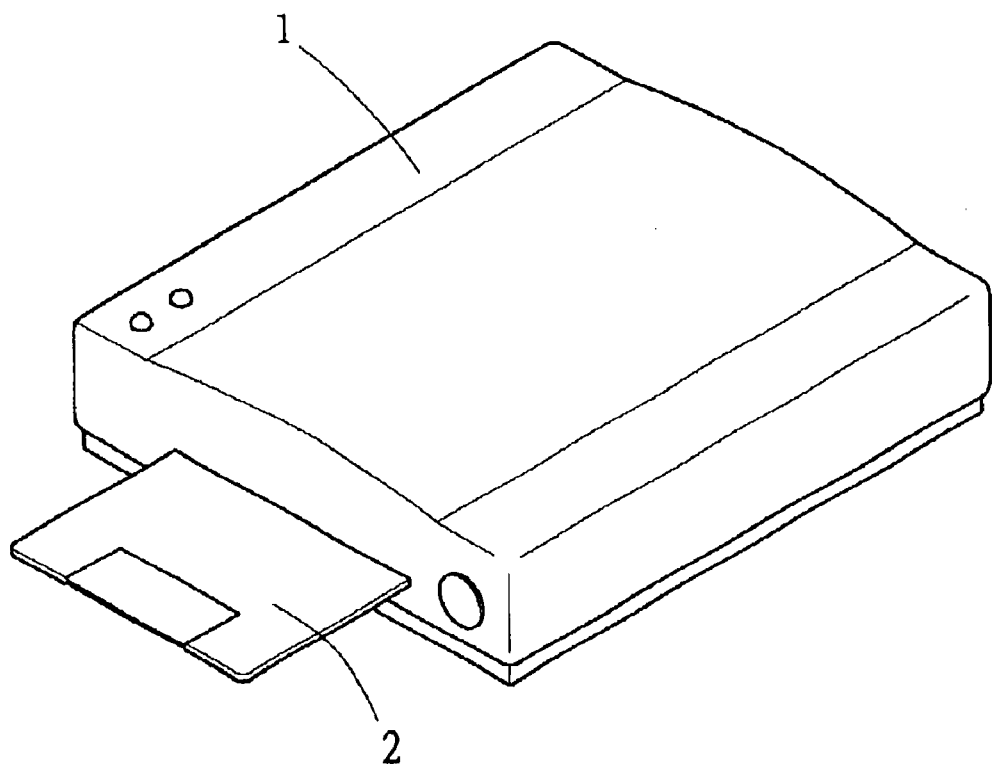
FIG. 1 is a perspective view showing insertion and extraction of an electronic memory card in a conventional technique.
Figure 2:
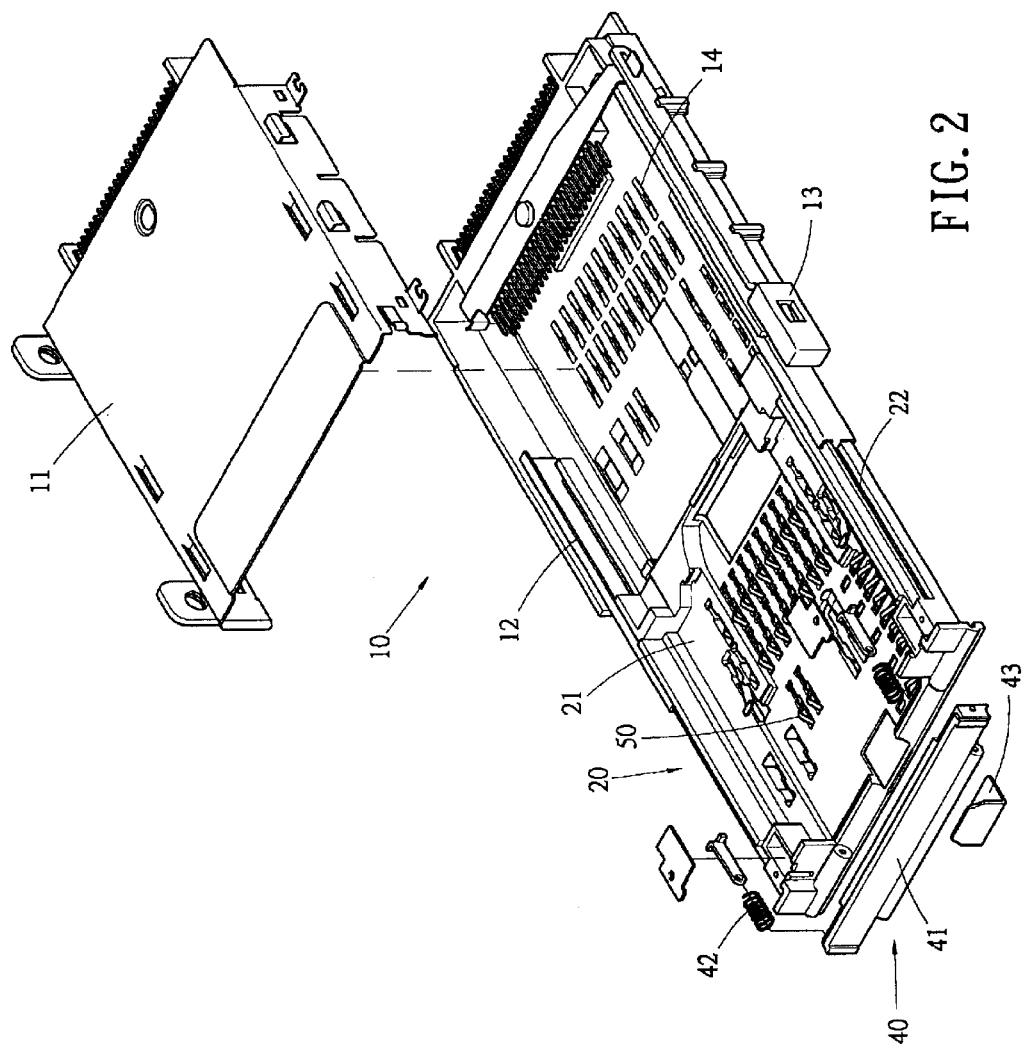
FIG. 2 is an analytic perspective view of the present invention.
Figure 3:
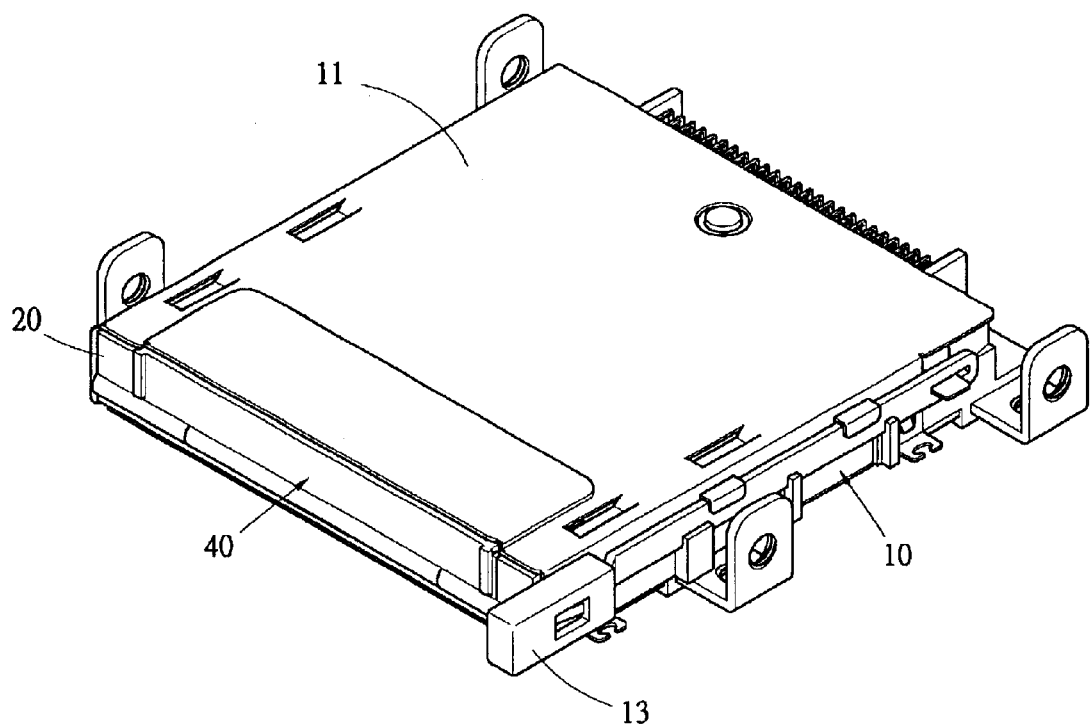
FIG. 3 is a perspective view of the present invention after assembling.
Figure 4:
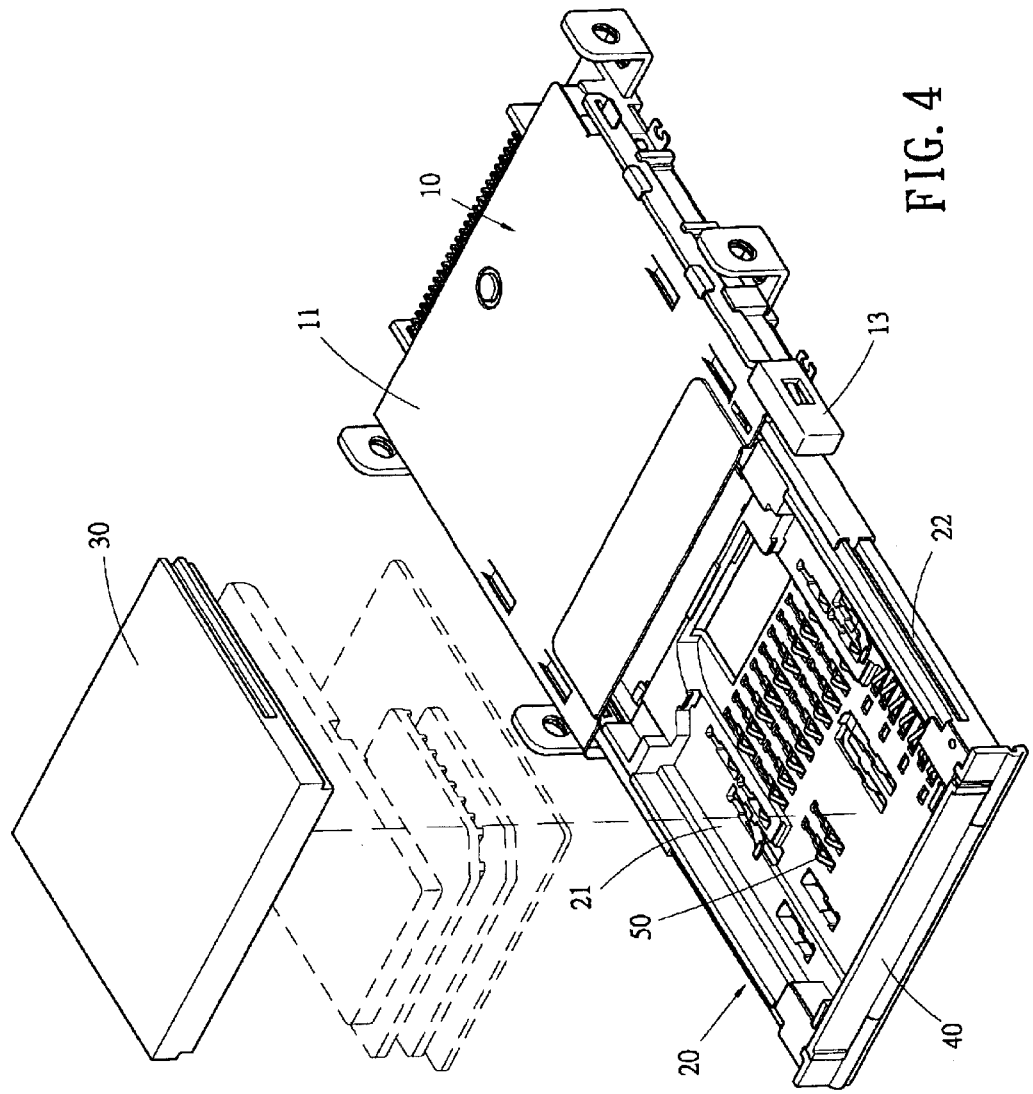
FIG. 4 is a schematic perspective view showing use of the present invention in receiving one of several electronic memory cards of different specifications.

Referring to FIGS. 2–4, the tray-type connecting module for electronic memory cards of the present invention is comprised of a base 10 and a tray 20.

Figure 7:
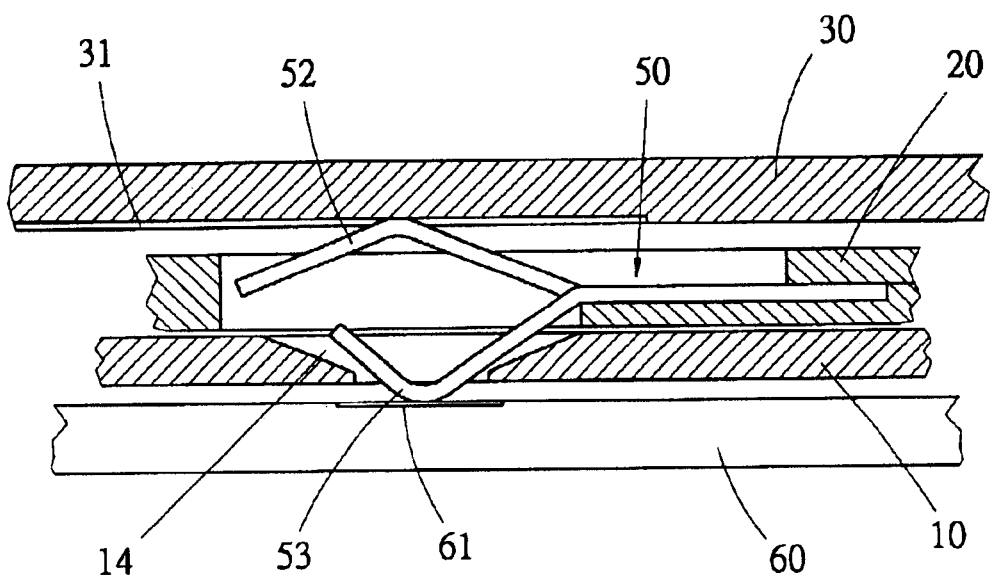
FIG. 7 is a schematic sectional view showing the relation of connecting among a base, a tray, the pins and the electronic memory card of the present invention.

The base 10 is mounted on the electric circuit board on a housing, and is provided thereover with an upper cover 11 to be fixed onto the housing; the base 10 is further provided on the lateral sides thereof with a slide rail 12 respectively, one side of them is provided with a card ejecting member 13; the base 10 is further provided on the bottom thereof with a plurality of through holes 14 in opposition to a plurality of connecting points on the electric circuit board (and referred to FIG. 7).

The tray 20 has centrally a receiving space 21 for receiving any of a plurality of electronic memory cards 30 with different specifications; and is provided on the lateral sides thereof with a guide slot 22 respectively in correspondence with the slide rails 12 respectively of the base 10, thereby, the tray 20 can slide on the base 10 for opening/closing; the tray 20 is provided on the front edge thereof with a limiting member 40, and is provided on the bottom thereof with a plurality of pins 50 in opposition to the through holes 14.

When the tray 20 is moved to slide for opening in order to receive an electronic memory card 30 in its receiving space 21, the limiting member 40 can place the electronic memory card 30 in position, and the pins 50 contact with the input/output pins on the electronic memory card 30; and when the tray 20 is moved to slide for closing, the pins 50 are in alignment with the through holes 14, and are electrically connected with the connecting points on the electric circuit board. When the electronic memory card 30 is to be taken out, the card ejecting member 13 is pressed to move and make slide of the tray 20 for opening, thereby a user can take out the electronic memory card 30.

As shown in FIGS. 4–7, in practicing the present invention, the pins 50 provided on the bottom of the above stated tray 20 in opposition to the through holes 14 are provided each with a fixed end 51 and a first and a second elastic contact end 52, 53; wherein the fixed end 51 is fixed on the tray 20 proper, while the first and the second elastic contact ends 52, 53 are respectively bent upwardly and downwardly.

When the tray 20 receives the electronic memory card 30, input/output pins 31 on the bottom of the electronic memory card 30 contact with the upwardly bending first elastic contact ends 52; and when the tray 20 moves and slides for closing, the downwardly bending second elastic contact ends 53 of the pins 50 are aligned with the through holes 14 and are electrically connected with the connecting points 61 on an electric circuit board 60 via the through holes 14. Now, the input/output pins 31 on the bottom of the electronic memory card 30 are electrically connected with the connecting points 61 on the electric circuit board 60 via the pins 50, and two way data transmission for reading and writing between the electronic memory card and the circuit board can be effected.

Figure 5:
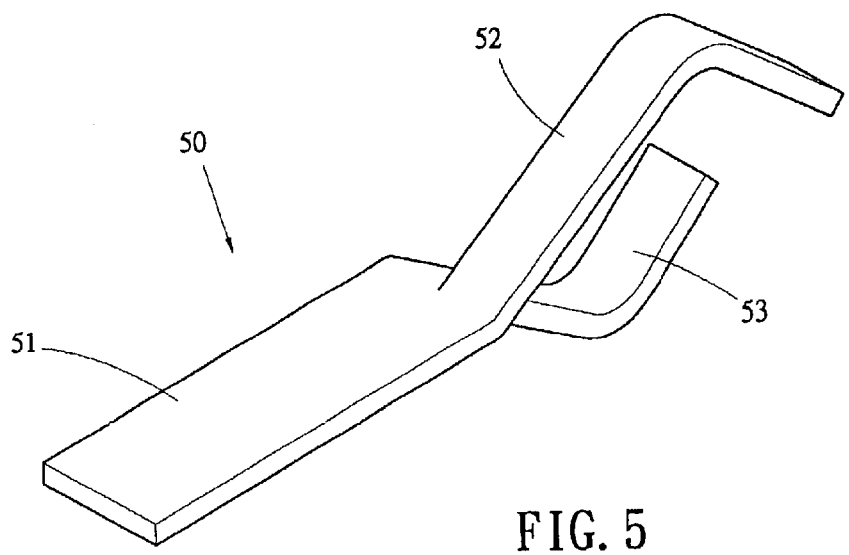
FIGS. 5, 6 are perspective views respectively of a first and a second embodiment of one of the pins of the present invention.
Figure 6:
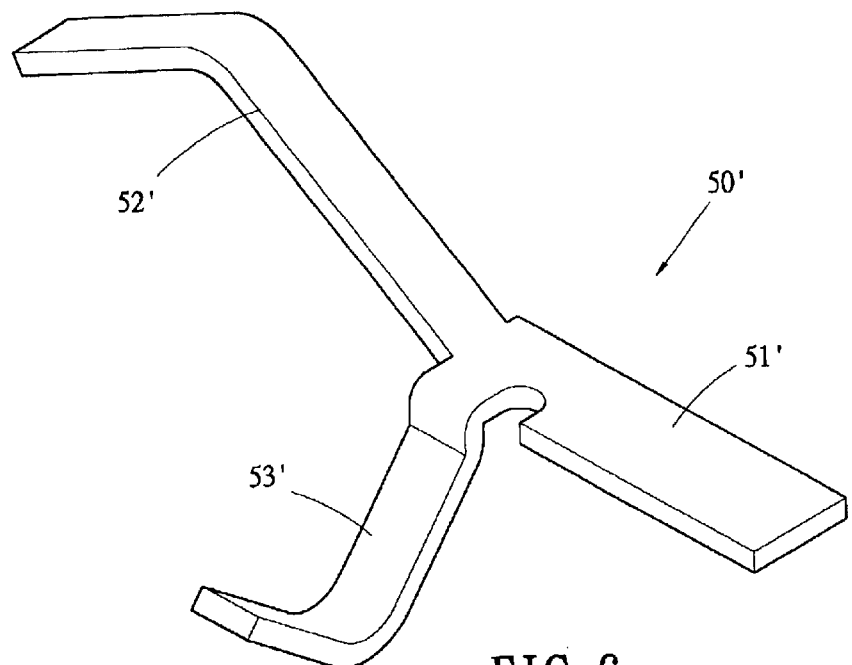

And as shown in FIGS. 5 and 6 showing two kinds of pins 50, 50' in practicing, the main point is, when the tray 20 moves and slides, the second elastic contact ends 53' will rubbed by the base 10. When the second elastic contact ends 53' are aligned with the through holes 14, the second elastic contact ends 53' can automatically snap into the through holes 14 to electrically connected with the connecting points 61 on the electric circuit board 60. Therefore, the direction that the second elastic contact ends 53' are bent down shall be same as that of the direction of sliding of the tray 20 to reduce the frictional force between the second elastic contact ends 53' and the base 10 during sliding.

And more, by virtue that the first and the second elastic contact ends 52, 52', 53, 53' of the pins 50, 50' are made respectively bending upwardly and downwardly, in the case that the second elastic contact ends 53, 53' are respectively bent downwardly in the direction same as that of the direction of sliding of the tray 20, the directions of the first elastic contact ends 52, 52' are not limited, and the input/output pins 31 of the electronic memory card 30 are not rubbed by the pins 50, 50', thereby, the orientation of the electronic memory card 30 to be placed is not limited, and a plurality of electronic memory cards of various specifications can commonly use the receiving space 21 in the tray 20 on a memory card connector. In this way, the memory card connector can receive thereon any of multiple electronic memory cards 30 of various specifications; this indirectly allows communication of the data among the multiple electronic memory cards with different specifications.

In the above stated embodiment, when the electronic memory card is placed on the tray 20, and when the input/output pins 31 on the bottom of the electronic memory card 30 are contacted with the first elastic contact end 52 bending upwardly, the first elastic contact end 52 will have a reaction acting upwardly to push up the electronic memory card 30, so that the limiting member 40 mentioned above can render the input/output pins 31 of the electronic memory card 30 to tightly contact the first elastic contact end 52.

Figure 8:
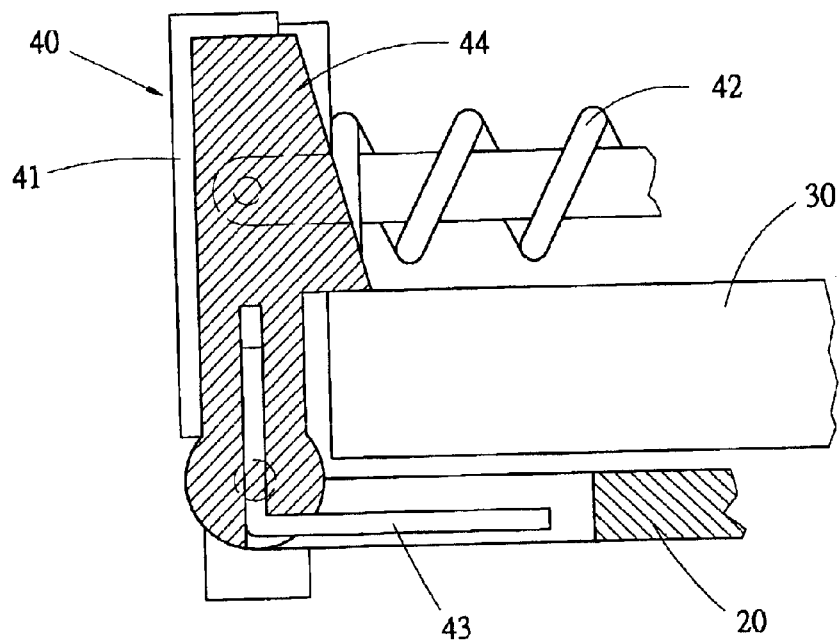
FIGS. 8, 9 are schematic views respectively showing the actions of a limiting member of the present invention.
Figure 9:
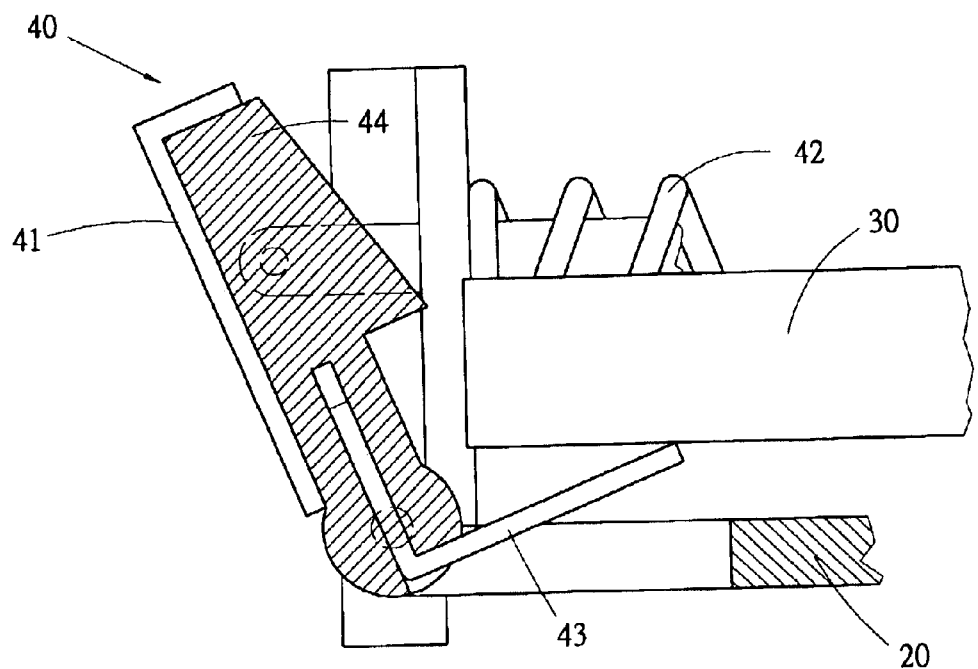

As shown in FIGS. 2, 8 and 9, in practicing, the limiting member 40 further includes a stop plate 41, at least an elastic member 42 and a linking piece 43; wherein the stop plate 41 is pivotally connected with the front edge of the tray 20 and thereby can be rotated forwardly and rearwardly, and is provided on the inner side thereof with a down inclining engaging hook 44. When the stop plate 41 is rotated forwardly; the elastic member 42 is given an elastic restoration force, and the bottom end of the linking piece 43 at the bottom of the stop plate 41 bends upwardly.

When the electronic memory card 30 is placed on the tray 20, and one side thereof pushes the inclining surface of the engaging hook 44, the stop plate 41 is slightly rotated forwardly to give the elastic member 42 an elastic restoration force; and when this side of the electronic memory card 30 passes the engaging hook 44, the stop plate 41 restores to its original position by the action force of the elastic member 42 to render the engaging hook 44 to impede the electronic memory card 30 from moving upwards, thereby an automatic position limiting function is provided.

When it is to take out the electronic memory card 30, the stop plate 41 can be slightly rotated forwardly to make the bottom end of the linking piece 43 at the bottom of the stop plate 41 bend upwardly; thereby, the linking piece 43 pushes the electronic memory card 30 upwards, and a user can take the electronic memory card 30 out of the tray 20. Moreover, as shown in FIG. 7, in the aforesaid embodiment, when the electronic memory card 30 is placed on the tray 20, the first elastic contact end 52 will have a reaction acting upwardly to push up the electronic memory card 30, hence when the electronic memory card 30 gets released from the position limiting action of the engaging hook 44 of the stop plate 41, the electronic memory card 30 can keep the state of being easily taken out unless it is pressed down. Thereby, an object of convenience of using can be achieved.

The names of the elements composing the present invention are only for illustrating the technique content of a preferred embodiment of the present invention, and not for giving any limitation to the scope of the present invention. It will be apparent to those skilled in this art that various equivalent modifications without departing from the spirit of this invention shall fall within the scope of the appended claims.

What is claimed is:

1. A tray-type connecting module for electronic memory cards comprising a base placed on an electric circuit board and a tray opened and closed by its sliding on said base to receive an electronic memory card, wherein the bottom of said base is provided with a plurality of through holes in opposition to a plurality of connecting points on said electric circuit board; a bottom of said the tray is provided in corresponding to said through holes with a plurality of pins; wherein when said tray is moved to slide for opening in order to receive said electronic memory card, said pins contact with input/output pins on an electronic memory card; and when said tray is moved to slide for closing, said pins of said tray are in alignment with said through holes, and are electrically connected with said connecting points on said electric circuit board.

2. The tray-type connecting module for electronic memory cards as in claim 1, wherein said base is provided thereover with an upper cover to be fixed onto a housing; said base is further provided on the lateral sides thereof with a slide rail respectively, one of said sides is provided with a card ejecting member; said tray is provided on the lateral sides thereof with a guide slot respectively in correspondence with said slide rails respectively of said base, thereby, said tray slides on said base for closing and opening; said tray is opened when said card ejecting member is pressed.

3. The tray-type connecting module for electronic memory cards as in claim 1, wherein said tray is provided on the front edge thereof with a limiting member for positioning said electronic memory card on said tray.

4. A tray-type connecting module for electronic memory cards comprising a base placed on an electric circuit board and a tray opened and closed by its sliding on said base to receive an electronic memory card, wherein the bottom of said the tray is provided with a plurality of pins having each a fixed end fixed on said tray, and first and second elastic contact ends respectively bent upwardly and downwardly; wherein when said tray moves and slides to open for receiving an electronic memory card, input/output pins on the bottom of said electronic memory card contact with said first elastic contact ends; and when said tray moves and slides for closing, said second elastic contact ends are electrically connected with said connecting points on electric circuit board.

5. The tray-type connecting module for electronic memory cards as in claim 4, wherein said base is further provided on the bottom thereof with a plurality of through holes in opposition to a plurality of connecting points on said electric circuit board, when said tray moves and slides for closing, said second elastic contact ends are aligned with said through holes and are electrically connected with said connecting points on said electric circuit board via said through holes.

6. The tray-type connecting module for electronic memory cards as in claim 4, wherein said base is provided thereover with an upper cover to be fixed onto a housing; said base is further provided on the lateral sides thereof with a slide rail respectively, one of said sides is provided with a card ejecting member; said tray is provided on the lateral sides thereof with a guide slot respectively in correspondence with said slide rails respectively of said base, thereby, said tray slides on said base for closing and opening; said tray is opened when said card ejecting member is pressed.

7. The tray-type connecting module for electronic memory cards as in claim 4, wherein said tray is provided on the front edge thereof with a limiting member for positioning said electronic memory card on said tray.

8. A tray-type connecting module for electronic memory cards comprising a base placed on an electric circuit board and a tray opened and closed by its sliding on said base to receive an electronic memory card, wherein the bottom of said the tray is provided with a plurality of pins, said tray is provided on the front edge thereof with a limiting member, said limiting member further includes a stop plate and at least an elastic member; when said tray moves and slides to open for receiving said electronic memory card, said stop plate is rotated forwardly, then said elastic member restores to its original position by the action force of said elastic member to make input/output pins of said electronic memory card contact with pins provided on said bottom of said tray; when said tray moves and slides for closing, said pins provided on said tray are electrically connected with said connecting points on said electric circuit board.

9. The tray-type connecting module for electronic memory cards as in claim 8, wherein said limiting member further includes a linking piece; when said stop plate is rotated slightly forwardly, the bottom end of said linking piece at the bottom of said stop plate bends upwardly, thereby, said linking piece pushes said electronic memory card upwards to allow a user to take said electronic memory card out of said tray.

10. The tray-type connecting module for electronic memory cards as in claim 8, wherein said base is provided thereover with an upper cover to be fixed onto a housing; said base is further provided on the lateral sides thereof with a slide rail respectively, one of said sides is provided with a card ejecting member; said tray is provided on the lateral sides thereof with a guide slot respectively in correspondence with said slide rails respectively of said base, thereby, said tray slides on said base for closing and opening; said tray is opened when said card ejecting member is pressed.

11. The tray-type connecting module for electronic memory cards as in claim 8, wherein said base is provided on the bottom thereof with a plurality of through holes in opposition to a plurality of connecting points on said electric circuit board, when said tray moves and slides for closing, said pins provided on said tray are aligned with said through holes and are electrically connected with said connecting points on said electric circuit board via said through holes.

* * * * *